United States Patent
Thronicke et al.

(10) Patent No.: US 7,624,551 B2
(45) Date of Patent: *Dec. 1, 2009

(54) MULTI-LAYER DECOUPLING, SEALING AND DRAINAGE SYSTEM

(75) Inventors: Sandro Gerd Thronicke, Lunen (DE); Peter Wilhelm Blanke, Iserlohn (DE)

(73) Assignee: Blanke GmbH & Co. KG, Iserlohn (DE)

( * ) Notice: Subject to any disclaimer, the term of this patent is extended or adjusted under 35 U.S.C. 154(b) by 423 days.

This patent is subject to a terminal disclaimer.

(21) Appl. No.: 10/595,695

(22) PCT Filed: Nov. 5, 2004

(86) PCT No.: PCT/DE2004/002457

§ 371 (c)(1),
(2), (4) Date: May 5, 2006

(87) PCT Pub. No.: WO2005/045152

PCT Pub. Date: May 19, 2005

(65) Prior Publication Data

US 2007/0130858 A1   Jun. 14, 2007

(30) Foreign Application Priority Data

Nov. 6, 2003   (DE) ............................ 203 17 247 U
Jun. 1, 2004   (DE) ...................... 10 2004 026 651

(51) Int. Cl.
*E04F 13/08*   (2006.01)
(52) U.S. Cl. .............................. 52/388; 52/389; 52/384; 52/385
(58) Field of Classification Search ................... 52/388, 52/384, 385, 389, 391, 747.11, 506.01, 507
See application file for complete search history.

(56) References Cited

U.S. PATENT DOCUMENTS 1,867,897 A * 7/1932 Stanbrough ................... 52/388

(Continued)

FOREIGN PATENT DOCUMENTS

DE   8814650 U1   3/1989

(Continued)

OTHER PUBLICATIONS

PCT Search Report dated Apr. 6, 2005 of Patent Application No. PCT/DE2004/002457 filed.

(Continued)

*Primary Examiner*—Richard E Chilcot, Jr.
*Assistant Examiner*—Mark R Wendell
(74) *Attorney, Agent, or Firm*—Vern Maine & Associates

(57) ABSTRACT

The invention relates to a multi-layer sealing and drainage system (1), in particular for the laying of ceramic paving (10) according to a thin-bed method (12). Said system comprises a layered construction containing, from the base upwards, a drainage layer (3) that is configured from a first lattice-type structural element and comprises drainage regions (13) that are formed between the lattice structures of said element, a liquid-permeable nonwoven layer (6), an anchorage layer (2) that is configured from a second lattice-type structural element and that is used to hold a filler material (12), which is to be incorporated into the upper face of the sealing and drainage system (1) and which is plastic during processing and subsequently cures, in addition to a reinforcement layer (5), which is fixed, at least in some sections, to the anchorage layer (2). The system can also comprise a sealing layer below the drainage layer.

29 Claims, 2 Drawing Sheets

U.S. PATENT DOCUMENTS

| | | | | |
|---|---|---|---|---|
| 2,887,867 | A * | 5/1959 | Burchenal et al. | 428/44 |
| 3,284,980 | A * | 11/1966 | Dinkel | 52/600 |
| 3,740,911 | A * | 6/1973 | O'Leary | 52/388 |
| 4,633,633 | A * | 1/1987 | Bard | 52/384 |
| 5,238,721 | A * | 8/1993 | Nakazawa | 428/44 |
| 5,546,708 | A * | 8/1996 | Efstratis et al. | 52/36.2 |
| 5,816,005 | A * | 10/1998 | Han | 52/391 |
| 6,151,854 | A * | 11/2000 | Gutjahr | 52/385 |
| 6,171,015 | B1 * | 1/2001 | Barth et al. | 404/34 |
| 6,901,712 | B2 * | 6/2005 | Lionel | 52/408 |

FOREIGN PATENT DOCUMENTS

| | | |
|---|---|---|
| DE | 29622129 U1 | 6/1997 |
| DE | 29921970 U | 4/2001 |
| DE | 1006075 | 9/2002 |
| DE | 20317247 U | 2/2004 |
| EP | 0386324 | 9/1990 |
| FR | 2774715 | 8/1999 |
| WO | 9925940 | 5/1999 |
| WO | 0042258 | 7/2000 |

OTHER PUBLICATIONS

English translation of the relevant parts of EP 0 386 324 B1, 5 pages.

* cited by examiner

MULTI-LAYER DECOUPLING, SEALING AND DRAINAGE SYSTEM

FIELD OF THE INVENTION

The present invention relates to a multilayer decoupling and sealing system, in particular for laying ceramic paving by using a thin-bed method.

BACKGROUND

Today, ceramic paving, in particular ceramic tiles, is usually laid using the so-called thin-bed method, in which the ceramic paving is laid in a thin, adhesive layer of tile mortar. This method, which is satisfactory for interior applications, is problematic when ceramic paving is to be laid in an exterior area, because the effects of moisture and temperature on paving of this kind frequently result in the gradual destruction of the tiles or the base in which they are laid, and it becomes impossible to avoid the diminished reliability of this type of paving, with the result that costly repair work may be required.

The main problem encountered when laying ceramic paving in an exterior area is the unavoidable moisture stress on the ceramic paving, which is caused by rain water or by other moisture that is precipitated because of temperature variations in the environment. Moisture of this kind passes through the ceramic paving, and in particular through the joints, into the substratum, where it can accumulate. Because the thin-bed method is used, it is as good as unavoidable that cavities will form beneath tiles, and in time these cavities will be filled with the water that has penetrated as described above, thereby causing a permanent moisture stress, on the one hand on the ceramic paving and on the other hand on the substratum. Because of these unavoidable cavities, it is possible, in particular during the cold time of the year, that the water that accumulates within the cavities in the thin-bed mortar will freeze and expand, thereby causing the ceramic paving to separate. In the same way, the water that accumulates within the cavities can generate a great deal of steam pressure as a result of solar radiation on ceramic paving laid in an exterior area and, in the case of glazed tiles, for example, this can cause the tiles to shatter. The same thing can happen in the case of freezing temperatures, since the pores within the tiles fill with water as a result of the permanent moisture stress, and then expand in the event of frost. This results in similar shattering of the ceramic surface. Furthermore, the accumulated water can cause chalk to be released from the joint mortar and from the thin-bed mortar, and this can result in efflorescence from the joints. In addition, the tile adhesive in the hollow spaces beneath the ceramic paving, which is usually processed as plastic mortar, can become superficially dissolved and thereby lose its strength. In addition to the foregoing, it is difficult to control the crack behaviour of the ceramic paving and of the substratum because of the very different coefficients of expansion of the substratum, the thin-bed mortar, and the ceramic paving, which are brought about by the very high temperature differences between the high temperatures caused by solar radiation and the low temperatures caused by frost that occur in the exterior area.

For this reason, it has frequently been proposed that ceramic paving of this type that is laid in an exterior area can be laid in a more durable fashion in that water that penetrates unavoidably from the top surface of the ceramic paving is deliberately drained out of the substratum of the ceramic paving once again. The basic idea underlying all these solutions is to deliberately incorporate cavities in the substratum beneath the ceramic paving. These cavities are not enclosed but rather permit the moisture that has penetrated to drain off through appropriate channels and in the grade by itself. This prevents water from accumulating and also ventilates the unavoidable cavities beneath the ceramic paving. For this reason, the water that has penetrated can remain within the ceramic paving or in its substratum only briefly, and is thereby prevented from causing the damage described heretofore. Furthermore, substrata of this kind beneath ceramic paving also bring about deliberate decoupling between the ceramic paving and substratum since, for example, stress cracks or loading cracks can frequently occur because of the different rates of thermal expansion or elasticity between the ceramic paving and the substratum.

This type of configuration for a sealing and drainage system is described in DE 100 60 751 C1. In this configuration, what is proposed is a sealing and drainage system that has a plastic or bitumen layer underneath, above which are disposed a first non-woven layer that is of a first hydrophobic polymer; above this there is a drainage layer that is of a second hydrophobic polymer, and then, above this, a second non-woven layer that is of the first hydrophobic polymer. It is true that, within certain limits, this layered construction permits moisture that has penetrated to drain out of the substratum of a tile layer; however, the mechanical load-bearing capacity of a layered, construction of this kind is unsatisfactory since embedding the uppermost non-woven layer in the tile mortar does not permit adequate anchoring or reinforcing function. The drainage layer is in the form of a lattice-type layer, although no exact details for forming the lattice-type layer are provided.

SUMMARY OF THE INVENTION

For this reason, it is the objective of the present invention to so develop a multilayer sealing and drainage system of this type such that in addition to an improvement of the drainage function in particular, it is also possible to achieve an improvement of the mechanical load-bearing capacity and anchoring to the tile layer.

This objective has been achieved by the distinguishing features set out in Patent claim 1 in conjunction with the features set out in the preamble. Further advantageous embodiments of the present invention are set out in the secondary claims.

One embodiment of the present invention describes a multilayer sealing and drainage system, used in particular for laying ceramic tiles using a thin-bed method, which is of a layered construction that consists, listed from bottom to top, of a drainage layer formed from a first lattice-type structural element, with drainage areas formed between the lattice structures of the lattice-type structural element, a liquid-permeable non-woven layer; an anchoring layer that is formed from a second lattice-type structure and used to hold a filler material that is to be incorporated into the upper face of the sealing and drainage layer, which is plastic during processing and subsequently cures; and a reinforcing layer that is fixed, at least in some sections, to the anchoring layer. A layered construction of this kind permits a significant improvement to known sealing and drainage systems in that, for each function such as anchoring and reinforcing, inhibiting the migration of joint mortar into the drainage area, the drainage of the liquid that is passing through, and decoupling separate layers from the substratum there are separate layers that, in combination with and because of their dimensions, achieve an optimal result. In this connection, particularly because of the anchoring layer that is disposed on top and the reinforcing layer that is laid above this and secured thereby, it is ensured that joint mortar that is applied on top bonds completely with the sealing and drainage system and in so doing ensures that an appropriate load-bearing capability of the sealing and drainage system is achieved. The non-woven layer that is interposed, and which is liquid-permeable, simultaneously prevents the filler, such as a tile adhesive, from penetrating into the drainage area and ensures that the drainage channels for draining the liquid that passes through the non-woven layer will always remain open. The lattice-type structural elements permit particularly simple construction of the anchoring layer and drainage layer that essentially determine the thickness of the sealing and drainage system.

In one advantageous embodiment, the first lattice-type structural element and the second lattice-type structural element can be of identical construction. This makes production of the sealing and drainage system particularly simple.

Provision can also be made such that the lattice-type structural element is formed from individual rods that are disposed relative to one another in the form of a lattice and secured to one another at the intersection points of the lattice. A lattice-type structural element of this kind can be manufactured very simply from identical, prefabricated individual rods, and for this reason it is possible to use individual rods that have been extruded cost effectively and wound onto drums and in each instance are positioned relative to each other for the production of the lattice-type structural elements. This makes production of such a lattice-type structural element both cost effective and simple. Unlike the case with other known sealing and drainage systems, no costly tools have to be made in order to manufacture the areas of the drainage layer that are angled relative to one another and formed in other ways.

In another embodiment, provision is made such that the individual rods of the lattice-type structural element are of an essentially rectangular cross section. In particular, if the edges of the individual rods are of unequal dimensions, the thickness of the lattice-type structural elements can be modified very simply and matched to various requirements.

It is a particular advantage if the intersecting individual rods of the lattice-type structural elements are so arranged that a first layer consists of identically oriented individual rods arranged beneath a second layer of individual rods disposed at an angle relative to the first rods and that are oriented identically to each other. This eliminates the need to warp the individual rods to one another during production, as is the case with textile fabrics; this further simplifies the production process and ensures that corresponding open spaces are formed between the identical layers of the lower and upper courses of individual rods, so that these spaces can be used for drainage.

It is also conceivable that the lattice-type structure of individual rods be in the form of a rhombus, a rectangle, or a square. Using such shapes ensures that when the sealing and drainage system is being used on site, the drainage channels that are formed can always be so arranged that the runoff of water that enters the drainage layer is adequately ensured by any slope at the location of the installation.

Further simplification of production of the drainage layer can be achieved if the individual rods of the two layers are welded to one another under pressure in the area where they intersect. For instance, by heating the individual rods, which can be shaped plastically by the effects of temperature, it can be ensured that softening and welding to the individual rod that lies in each instance below can take place in the area where the individual rods are in contact with each other. This then results in a matting-like structure made up of individual rods.

It is also conceivable that, for instance when welding the individual rods, the individual rods of the lattice-type structural element have slanted edge areas at least at the points of intersection with one another; this forms under-cut sections on the individual rods. Because of the plastic reshaping of the individual rods in the points of intersection brought about by the effects of temperature, the individual rods are deformed somewhat by mechanical pressure and thereby change their orientation, depending on the course of the other individual rod that is to be joined with the particular rod. This leads to the formation of undercuts areas that are, for instance, advantageous for anchoring the filler material. Because of its plasticity, the filler material penetrates into these undercut areas when being worked and, after hardening, can adhere very much better to the anchoring layer because of the undercuts in the individual rods.

In another configuration, it is conceivable that the reinforcing layer be welded or cemented onto the anchoring layer. Because of this, on the one hand, the reinforcing layer can be well embedded in the filler material and, on the other hand, it adheres securely to the anchoring layer, which is similarly filled with filter material. This results in a particularly good bond between the filler material and the reinforcing layer or the anchoring layer, respectively. In this connection, it is conceivable that the reinforcing layer be formed as a lattice-type fabric, in one embodiment, as a glass-fiber fabric, which serves to provide more secure anchoring with the filler material that is to be incorporated at the top of the sealing and drainage system.

When handling larger areas of the sealing and drainage system it is an advantage if the reinforcing layer extend beyond the other layers, at least in some edge areas of the sealing and drainage system, in order to create a transition to other sections of the decoupling and drainage system. This can provide an appropriately overlapped connection on the edges of the individually workable strips that entails no loss of strength in the areas of transition between adjacent strips.

It is also conceivable that the decoupling and drainage system can be laid so as to float on a substratum. This ensures complete decoupling of installed tile paving from the underlying substratum, which is necessary in the case of widely differing coefficients of thermal expansion or working substrata such as wooden floors.

In another arrangement, it is conceivable that the sealing and drainage system can be laid rigidly, in one embodiment cemented, on a substratum. This results in more secure attachment of the sealing and drainage system, should this be both permissible and useful because of the properties of said substratum.

In addition, in another arrangement is conceivable that beneath the lower drainage layer there be a moisture-impermeable sealing layer arranged on the drainage layer. Because of this, additional or simple sealing of the substratum, which can usually only be achieved by sealing layers that are applied separately, is achieved when the sealing and drainage system is laid. The substratum can then remain unprocessed by the application of the sealing and drainage system according to one embodiment of the present invention, if special sealing properties are either required or not available on site.

In yet another arrangement, it is conceivable that the sealing layer can be self-adhering to the bordering sealing layers of another section of the sealing and drainage system. This means that even larger areas of the substratum that are to be sealed can be sealed reliably and simply in one operation, without the dimensions of prefabricated units of the sealing and drainage system in, for instance, rolls, being restrictive. One possible arrangement of such an adhesive sealing layer can be effected if the self-sealing layer is of a bitumen-cold self-adhesive strip. Such bitumen cold self-adhering strips are commercially available and for this reason are not described in greater detail herein. It is also conceivable that the sealing layer be a polymer sealing layer, in particular a polyethylene sealing layer. Such polymer sealing layers are known in principle in a comparable formulation. When sealing larger areas, it is an advantage if the sealing layer of the polymer sealing layer extend, at least in some edge areas of the sealing and drainage system, beyond the other layers, in order to create a transition area to the other sections of the sealing and drainage system that is impermeable to moisture. In this way it is possible to achieve a joint to adjacent to the laid strips that is similarly impervious to moisture in the area of the overlap.

With respect to the dimensions of the individual layers of the sealing and drainage system it is conceivable that the thickness of the drainage layer be between 2 and 6 mm, the thickness of the anchoring layer be between 2 and 6 mm, and thus, in one arrangement, the overall thickness of the sealing and drainage system amount essentially to between 4 and 12 mm. Because of this, the sealing and drainage system does not essentially fill, relative to a predetermined substratum, and can be used without any problems even in spatially tight construction situations.

It is advantageous for the drainage effect if the liquid permeable non-woven layer exhibits very low resistance to the flow of liquid and, at the same time, prevents the relatively viscous filler material, which is plastic when incorporated into the anchoring layer, from penetrating into the drainage layer. By this means it is possible to achieve good conductance of the liquid through the non-woven layer without the danger that that the filler material can, as it is being processed, penetrate into the drainage areas and block them.

It is a significant advantage for the utilization properties of the sealing and drainage system according to one embodiment of the present invention if, after the installation of the filler material, the anchoring layer is essentially completely filled with filler material and the reinforcing layer that is embedded in the hardened filler material performs a stiffening and reinforcing function for dispersing mechanical loads that are introduced from above, with the result that load dispersal is possible through significantly greater layer thicknesses than is the case with known sealing and drainage systems since, in addition, the whole layer thickness of the anchoring layer helps to bear the loads and, at the same time, is reinforced by the reinforcing layer.

In a further development, it is also conceivable that there be a barrier layer beneath the drainage layer, in particular a barrier layer to provide sound proofing, in particular for attenuating impact noise. Such a barrier layer, which can be formed, for example, by a polymer layer, in particular a polyethylene layer or a bitumen layer or any other material that is suitable for attenuating noise, permits acoustic decoupling, for example of a ceramic paving from the substratum, and so that impact noise that is introduced on the ceramic paving is further attenuated by the barrier layer, and can thus be transferred to the substratum having been considerably reduced.

BRIEF DESCRIPTION OF THE DRAWINGS

One embodiment of the decoupling and sealing system according to the present invention is shown in the drawings appended hereto. These drawings show the following.

DETAILED DESCRIPTION

Figure 1:
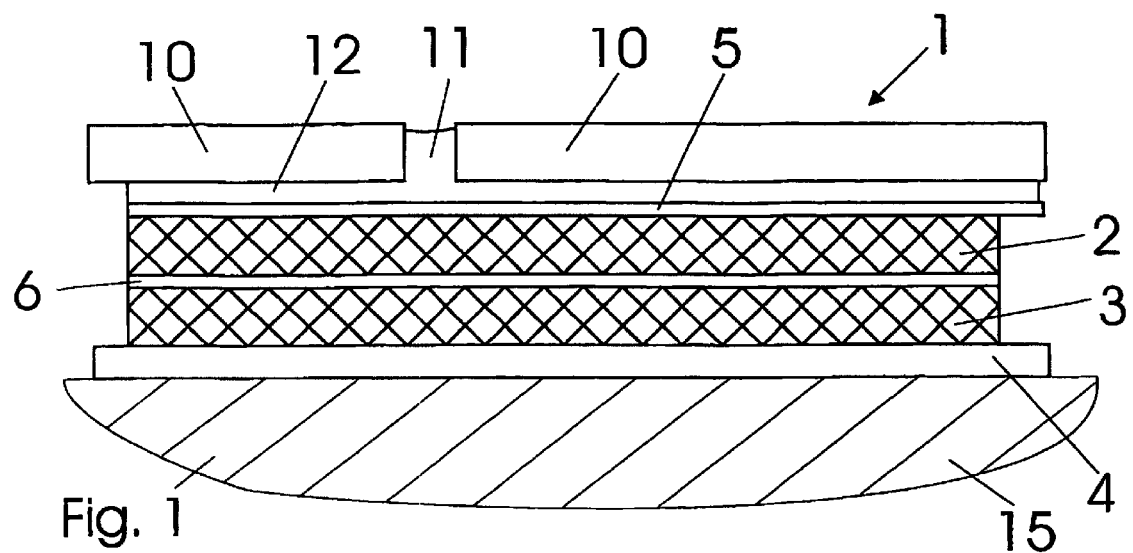
FIG. 1: a cross section through a decoupling and sealing system according to one embodiment of the present invention, which shows the layered structure.
Figure 2:
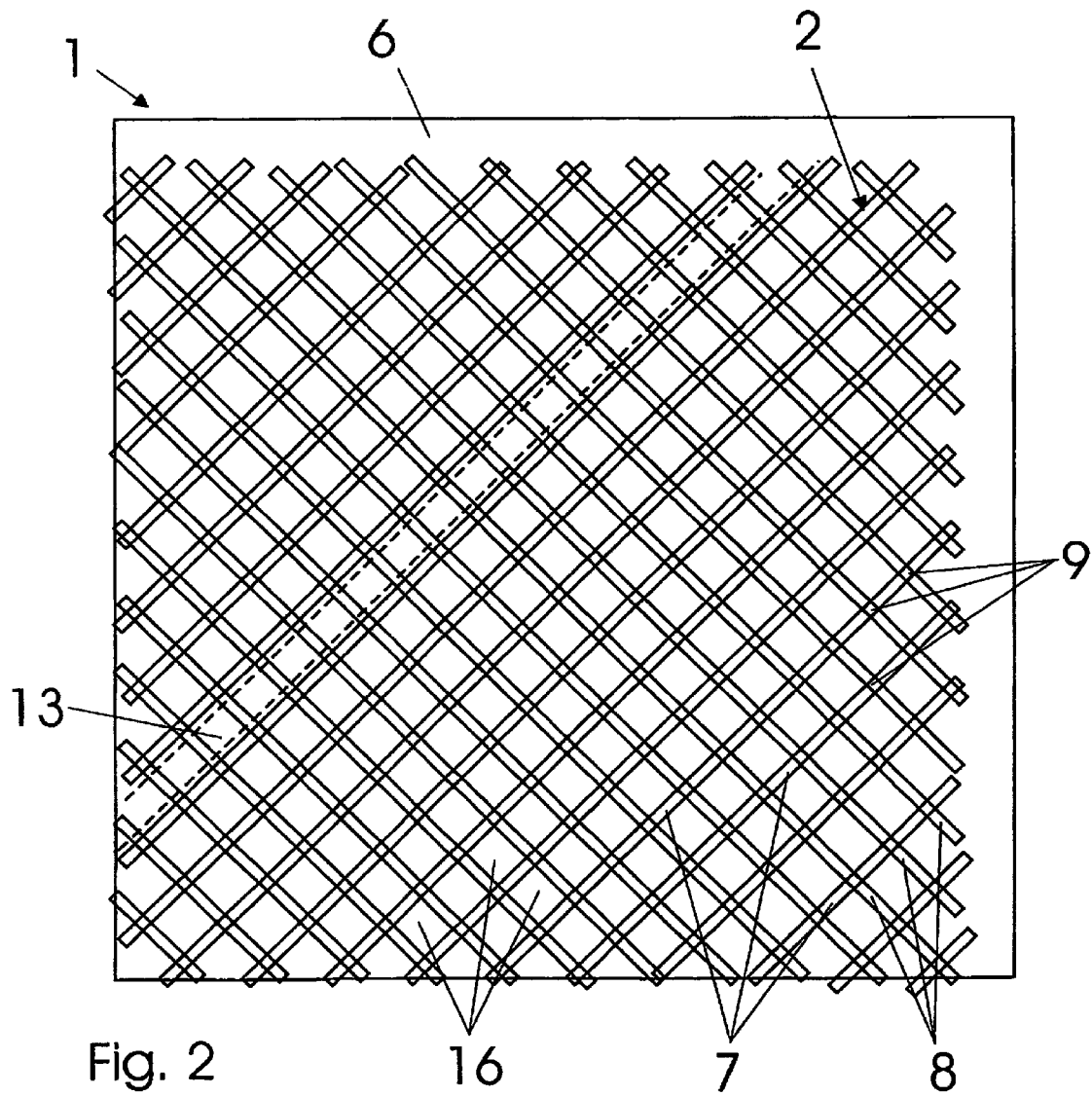
FIG. 2: a plan view of a decoupling and sealing system according to one embodiment of the present invention, as shown in FIG. 1.
Figure 3:
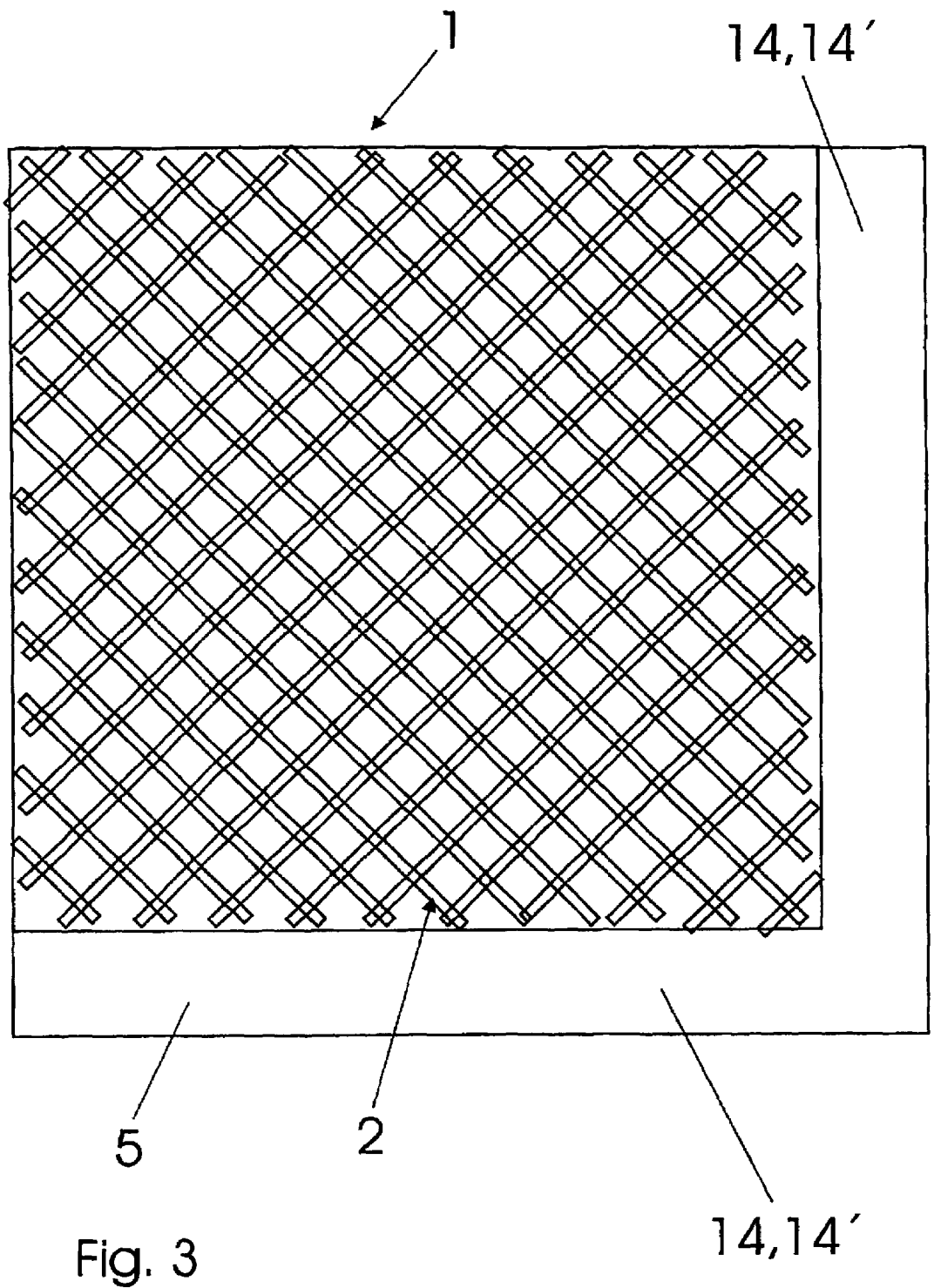
FIG. 3: the arrangement of overlapping areas for the reinforcing layer and the sealing layer on a decoupling and sealing system according to one embodiment of the present invention, as shown in FIG. 1.

FIG. 1 is a cross sectional side view that shows the layered structure of a multilayer decoupling, sealing, and drainage system 1. FIG. 2 is a cross sectional plan view at the level of a non-woven layer 6, and FIG. 3 is a plan view of the decoupling, sealing and drainage system 1, in cross section along the reinforcing layer 5. In FIG. 1, the decoupling, sealing, and drainage system 1 according to one embodiment of the present invention is shown installed on a substratum 15, for instance in a cement screed or the like. Tile paving made up of tiles 10 can be seen above the decoupling, sealing, and drainage system 1 and this is laid in tile mortar 12 by the thin-bed method. The joints 11 between the individual tiles 10 are similarly filled with tile mortar 12.

The decoupling, sealing, and drainage system 1 consists of a sealing layer 4 that is applied to the substratum 15 and can be formed, for example, from bitumen or polyethylene and can be laid as a strip of predetermined width. The sealing layer 4 can be cemented to the substratum 15 and it is also conceivable to allow the sealing layer 14 to float on the substratum 15 in order to decouple the substratum 15 from the tile paving 10. Such installation methods are known in principle, and for this reason will not be described in greater detail herein.

Above this sealing layer 4, a drainage layer 3, which is of a lattice-type structure that will be described below, is bonded to the sealing layer 4; above this there is a liquid-permeable non-woven layer 6 that is also joined to the drainage layer 3. This connection can be effected, for example, by cementing or welding in the manner known in principle, depending on the materials that are being used.

Above the non-woven layer 6 there is an anchoring layer 2 that is connected to the non-woven layer 6; this is also of a lattice-type structure similar to that of the sealing layer 4. This anchoring layer 2, like the reinforcing layer 5 that is connected to and disposed above it, serves to anchor the sealing and drainage system 1 onto the tile mortar 12 and thereby to the layer of tiles 10. The reinforcing layer 5 can, for example, consist in a manner known in principle of a lattice-type glassfibre textile that incorporates appropriate openings and free areas so that the tile mortar 12 can penetrate as deeply as possible into the anchoring layer 2. The anchoring layer 2 incorporates—as described in greater detail—receiving spaces 16 for the tile mortar 12, and thereby serves to improve the anchoring of the tile mortar 12 to the multilayer sealing and drainage system 1.

The layer made up of tiles 10 is installed in that before the tiles 10 are laid, the tile mortar is applied on top of the reinforcing layer 5 and then trowelled so that it is pressed as deeply as possible through the openings in the reinforcing layer 5 into the anchoring layer 2. The tile mortar 12, which is worked when in a plastic state, thus fills the receiving spaces 16 in the anchoring layer 2 and flows almost completely around the individual rods 7, 8 of the anchoring layer 2, which are formed in a manner described in greater detail below. Once the tile mortar 12 has hardened, there is a very solid bond between the anchoring layer 2, the reinforcing layer 5, and the tile mortar 12 that, on the one hand, anchors the tiles 10 firmly to the sealing and drainage system 1 and, on the other hand, brings about a stable panel-like configuration of the anchoring layer 2. Because of this, the sealing and drainage system 1 can withstand mechanical loads that are applied to the tiles 10 from above in a particularly effective way.

The tile mortar 12 that penetrates into the receiving spaces 16 in the anchoring layer 10 is prevented from penetrating further into the drainage layer 3 that is disposed below it by the non-woven layer 6, for the non-woven layer 6 is of a uniform textile-like form that does not permit the relatively viscous tile mortar 12 to pass through it. Nonetheless, the non-woven layer 6 is permeable to liquid, so that moisture that penetrates the tile layer from above the tiles 10 into the sealing and drainage system 1 in the form of surface water can pass through the non-woven layer 6 and into the drainage layer 3. This means that moisture can penetrate into the sealing and drainage system 1 in that moisture penetrating, for instance, through the gaps 11 or through small cracks in a tile mortar 12 enters the gaps 11 between the tiles 10. In the same way, it is conceivable that moisture of this kind can penetrate beneath the tiles 10 by diffusion. In sealing systems that are built up in the conventional manner, this moisture cannot escape and results in damage to the tiles 10 or to the substratum 15. Using the structure described herein, this surface water can pass through the anchoring layer 2 and through the non-woven layer 6 and enter the drainage layer 3 that incorporates drainage channels 13 as a result of its lattice-type structure, these drainage channels 13 being in unobstructed contact with the environment so that the moisture can flow off or evaporate through them. As a result, no standing water can remain below the layer of tiles 10, so that no corresponding damage can the caused.

The lattice-type structure of the drainage layer 3 and of the anchoring layer 2 is formed from individual rods 7, 8 that are disposed an angle to one another, and when arranged one above the other of these form a two-course layer arrangement made up of the layers 2, 3. Each of the individual rods 7, 8 is of approximately rectangular cross section and they are hot-welded to one another at the points where they intersect 9. In a particularly simple manner this forms an arrangement wherein parallel groups of individual rods 7 are disposed one above the other and these are connected to similar parallel groups of individual rods 8 that are disposed at an angle to the groups of individual rods 7. Continuous drainage channels 13 are formed between the individual rods 7 or 8, respectively, within the drainage layer 3, and these permit liquid passing through them to drain off directly, and they simultaneously permit ventilation of the anchoring layer 2 from below and the substratum 15 from above. Because of this, it is impossible for water to accumulate beneath the layer of tiles 10. In each instance, a receiving space for the tile mortar 12 is formed between the individual rods 7, 8 and this is continuous in the same way as the drainage channels 13.

Within the anchoring layer 12, the lattice-type structure of individual rods 7, 8 also entails the advantage that within the area of the points of intersection 9, when the individual rods 7, 8 are welded, areas that have undercut portions are formed on the individual rods 7, 8, and these result in the tile mortar 12 that penetrates these areas being securely locked to the individual rods 7, 8 after it has hardened.

When larger areas are to be processed, it is recommended that both the reinforcing layer 5 and the sealing layer 4 be allowed to extend far enough beyond the edges of the lattice-type drainage layer 3 and the lattice type anchoring layer 2 in overlap areas 14, 14' such that, overlapping these, they can be cemented or otherwise secured to corresponding layers that are to be adjacent to them.

It is self-evident that the arrangement of the individual rods 7, 8 that the shown in FIG. 2 and FIG. 3 should be considered only as examples, and that any type of geometrical pattern that is advantageous for the properties of the decoupling and sealing system described herein can be formed from such individual rods 7, 8.

PARTS LIST

1—Sealing and draining system
2—Anchoring layer
3—Drainage layer
4—Sealing layer
5—Reinforcing layer
6—Non-woven layer
7—Individual rod
8—Individual rod
9—Area of intersection
10—Non-woven material
11—Joint
12—Tile mortar
13—Drainage channel
14—Area of overlap
15—Substratum
16—Receiving space

The invention claimed is:

1. A multilayer decoupling, sealing and drainage system in particular for laying ceramic paving by using a thin-bed method, said system comprising a layered construction containing, from the base upwards,
a drainage layer that is formed from a lattice-type structural element and comprising drainage areas that are formed between the lattice structures of the lattice-type structural element,
a liquid-permeable and non-woven layer,
an anchoring layer that is configured from a second lattice-type structural element and used to hold a filler material that is to be incorporated into the upper face of the sealing and drainage system, which is plastic during processing and subsequently cures,
a reinforcing layer which is fixed, at least in some sections, to the anchoring layer.

2. The multilayer decoupling, sealing, and drainage system as defined in claim 1, characterized in that the first lattice-type structural element and the second lattice-type structural element, are of identical structure.

3. The multilayer decoupling, sealing, and drainage system as defined in claim 1, characterized in that the lattice-type structural element is formed from individual rods that are disposed to one another in the manner of a lattice and fixed to one another at the points of intersection of the lattice.

4. The multilayer decoupling, sealing, and drainage system as defined in claim 3, characterized in that the individual rods of the lattice-type structural element are of an essentially rectangular cross section.

5. The multilayer decoupling, sealing, and drainage system as defined in claim 3, characterized in that the intersecting individual rods of the lattice-type structural element, are so arranged that a first layer consists of identically oriented individual rods beneath a second layer of individual rods that are disposed at an angle thereto and are in each instance oriented identically to one another.

6. The multilayer decoupling, sealing, and drainage system as defined in claim 1, characterized in that the lattice-type structure of the individual rods is in the form of a rhombus, a rectangle, or a square.

7. The multilayer decoupling, sealing, and drainage system as defined in claim 1, characterized in that the individual rods of the two layers are welded to one another at the points of intersection when under mechanical pressure.

8. The multilayer decoupling, sealing, and drainage system as defined in claim 1, characterized in that the individual rods of the lattice-type structural element have slanted edge areas, at least at their points of intersection, thereby forming undercut sections on the individual rods.

9. The multilayer decoupling, sealing, and drainage system as defined in claim 1, characterized in that free, channel-like areas for removing liquid that penetrates the sealing and drainage system are formed between the first and second layer of individual rods.

10. The multilayer decoupling, sealing, and drainage system as defined in claim 9, characterized in that because of the arrangement of the lattice-type structures, when the sealing and drainage system has been laid, the channel areas are so arranged that fluid that has penetrated the sealing and drainage system drains off independently.

11. The multilayer decoupling, sealing, and drainage system as defined in claim 1, characterized in that the reinforcing layer is welded onto the anchoring layer.

12. The multilayer decoupling, sealing, and drainage system as defined in claim 1, characterized in that the reinforcing layer is cemented onto the anchoring layer.

13. The multilayer decoupling, sealing, and drainage system as defined in claim 1, characterized in that the reinforcing layer is in the form of a lattice-type textile, to provide for secure anchoring with the filler material that is to be incorporated on top of the sealing and drainage system.

14. The multilayer decoupling, sealing, and drainage system as defined in claim 1, characterized in that the reinforcing layer extends beyond the other layers at least in individual edge areas of the sealing and drainage system so as to create a transition to other sections of the sealing and drainage system.

15. The multilayer decoupling, sealing, and drainage system as defined in claim 1, characterized in that the sealing and drainage system is laid so as to float on a substratum.

16. The multilayer decoupling, sealing, and drainage system as defined in claim 1, characterized in that the sealing and drainage system is laid rigidly on a substratum.

17. The multilayer decoupling, sealing, and drainage system as defined in claim 1, characterized in that below the drainage layer there is a sealing layer arranged on the drainage layer, said sealing layer being impermeable to liquid.

18. The multilayer decoupling, sealing, and drainage system as defined in claim 17, characterized in that the sealing layer is attached so as to self-adhere to adjacent sealing layers of other sections of the sealing and drainage system.

19. The multilayer decoupling, sealing, and drainage system as defined in claim 17, characterized in that the self-adhering sealing layer is a bitumen-cold self-adhering strip.

20. The multilayer decoupling, sealing, and drainage system as defined in claim 17, characterized in that the sealing layer is formed from a polymer sealing layer, in particular from a polyethylene sealing layer.

21. The multilayer decoupling, sealing, and drainage system as defined in claim 20, characterized in that the sealing layer of a polymer sealing layer extends beyond the other layers of the sealing and drainage system, at least in individual edge areas so as to create a transition area that is impermeable to liquids to other sections of the sealing and drainage system.

22. The multilayer decoupling, sealing, and drainage system as defined in claim 1, characterized in that the thickness of the drainage layer is between 2 and 6 mm.

23. The multilayer decoupling, sealing, and drainage system as defined in claim 1, characterized in that the thickness of the anchoring layer is between 2 and 6 mm.

24. The multilayer decoupling, sealing, and drainage system as defined in claim 1, characterized in that the overall thickness of the sealing and drainage system is between 4 and 12 mm.

25. The multilayer decoupling, sealing, and drainage system as defined in claim 1, characterized in that the liquid permeable non-woven layer exhibits very low resistance to the passage of liquid.

26. The multilayer decoupling, sealing, and drainage system as defined in claim 1, characterized in that the liquid-permeable non-woven layer prevents the filler material, which is incorporated into the anchoring layer when plastic, from penetrating into the drainage layer.

27. The multilayer decoupling, sealing, and drainage system as defined claim 1, characterized in that after the incorporation of the filler material, the anchoring layer is essentially completely filled with the filler material and the reinforcing layer that is imbedded in the hardened filler material performs a stiffening and reinforcing function with respect to mechanical loads applied from above.

28. The multilayer decoupling, sealing, and drainage system as defined in claim 1, characterized in that a barrier layer, in particular a barrier layer for providing soundproofing and in particular for attenuating impact noise, is arranged beneath the drainage layer.

29. The multilayer decoupling, sealing, and drainage system as defined in claim 1, characterized in that the barrier layer is formed by a polymer layer, in particular by a polyethylene layer, or is formed by a bitumen layer.

* * * * *